United States Patent
He et al.

(10) Patent No.: US 7,552,523 B1
(45) Date of Patent: Jun. 30, 2009

(54) METHOD FOR MANUFACTURING A PERPENDICULAR MAGNETIC RECORDING TRANSDUCER

(75) Inventors: Li He, Fremont, CA (US); Jun Liu, San Ramon, CA (US); Danning Yang, Fremont, CA (US); Yining Hu, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 551 days.

(21) Appl. No.: 11/172,778

(22) Filed: Jul. 1, 2005

(51) Int. Cl.
*G11B 5/127* (2006.01)
*H04R 31/00* (2006.01)

(52) U.S. Cl. ............... 29/603.16; 29/603.13; 29/603.14; 29/603.15; 29/603.18; 216/62; 216/66; 216/67; 360/122; 360/317; 451/5; 451/41

(58) Field of Classification Search . 29/603.13–603.16, 29/603.18; 216/62, 66, 67; 360/122, 317; 451/5, 41
See application file for complete search history.

(56) References Cited

U.S. PATENT DOCUMENTS

| | | |
|---|---|---|
| 4,274,022 A | 6/1981 | Elsel |
| 4,404,609 A | 9/1983 | Jones, Jr. |
| 4,546,398 A | 10/1985 | Toda et al. |
| 4,636,897 A | 1/1987 | Nakamura et al. |
| 4,646,429 A | 3/1987 | Mori |
| 4,779,463 A | 10/1988 | Woodruff |
| 4,855,854 A | 8/1989 | Wada et al. |
| 4,943,882 A | 7/1990 | Wada et al. |
| 5,027,247 A | 6/1991 | Nakanishi |
| 5,181,151 A | 1/1993 | Yamashita et al. |
| 5,225,953 A | 7/1993 | Wada et al. |
| 5,393,233 A | 2/1995 | Hong et al. |
| 5,578,857 A | 11/1996 | Hong et al. |
| 6,261,918 B1 | 7/2001 | So |
| 6,292,329 B1 | 9/2001 | Sato et al. |
| 6,315,839 B1 | 11/2001 | Pinarbasi et al. |
| 6,353,995 B1 | 3/2002 | Sasaki et al. |
| 6,433,970 B1 | 8/2002 | Knapp et al. |
| 6,475,062 B1 | 11/2002 | Kubota et al. |
| 6,501,619 B1 | 12/2002 | Sherrer et al. |
| 6,504,675 B1 | 1/2003 | Shukh et al. |
| 6,513,228 B1 | 2/2003 | Khizroev et al. |
| 6,522,007 B2 | 2/2003 | Kouno et al. |
| 6,587,314 B1 | 7/2003 | Lille |
| 6,709,322 B2 | 3/2004 | Saldana et al. |
| 6,743,642 B2 | 6/2004 | Costrini et al. |
| 6,751,054 B2 | 6/2004 | Sato et al. |
| 6,757,141 B2 | 6/2004 | Santini et al. |
| 6,784,548 B2 | 8/2004 | Kouno et al. |
| 6,807,027 B2 | 10/2004 | McGeehin et al. |
| 6,808,442 B1 | 10/2004 | Wei et al. |
| 6,833,979 B1 | 12/2004 | Knapp et al. |

(Continued)

*Primary Examiner*—Paul D Kim
(74) *Attorney, Agent, or Firm*—Virtual Law Partners LLP (57) ABSTRACT

A method and system for manufacturing a perpendicular magnetic recording transducer by a process that includes plating is described. The method and system include forming a chemical mechanical planarization (CMP) uniformity structure around a perpendicular magnetic recording pole. The CMP uniformity structure has a height substantially equal to a desired pole height. The method and system also include fabricating an insulator on the CMP uniformity structure and performing a CMP to remove a portion of the insulator. The CMP exposes a portion of the perpendicular magnetic recording pole and planarizes an exposed surface of the perpendicular magnetic recording transducer.

14 Claims, 8 Drawing Sheets

U.S. PATENT DOCUMENTS

| | | |
|---|---|---|
| 6,836,957 B2 | 1/2005 | Kobayashi |
| 6,843,707 B2 | 1/2005 | Saldana et al. |
| 6,876,518 B2 | 4/2005 | Khizroev et al. |
| 6,876,519 B1 | 4/2005 | Litvinov et al. |
| 6,952,867 B2 | 10/2005 | Sato |
| 7,206,166 B2 | 4/2007 | Notsuke et al. |
| 7,227,720 B2 | 6/2007 | Sasaki et al. |
| 7,296,339 B1 * | 11/2007 | Yang et al. ............... 29/603.16 |
| 2001/0008501 A1 | 7/2001 | Sekine |
| 2001/0035357 A1 | 11/2001 | Sasaki |
| 2002/0006013 A1 | 1/2002 | Sato et al. |
| 2002/0012195 A1 | 1/2002 | Lahiri et al. |
| 2002/0012196 A1 | 1/2002 | Obara |
| 2002/0151254 A1 | 10/2002 | Saldana et al. |
| 2002/0190382 A1 | 12/2002 | Kouno et al. |
| 2002/0191336 A1 | 12/2002 | Hsiao et al. |
| 2003/0039064 A1 | 2/2003 | Khizroev et al. |
| 2003/0071263 A1 | 4/2003 | Kouno et al. |
| 2003/0117749 A1 | 6/2003 | Shukh et al. |
| 2004/0001283 A1 | 1/2004 | Fontana et al. |
| 2004/0008446 A1 | 1/2004 | Schmidt |
| 2004/0008451 A1 | 1/2004 | Zou et al. |
| 2004/0032692 A1 | 2/2004 | Kobayashi |
| 2004/0102138 A1 | 5/2004 | Saldana et al. |
| 2004/0150912 A1 | 8/2004 | Kawato et al. |
| 2004/0161576 A1 | 8/2004 | Yoshimura |
| 2004/0252415 A1 | 12/2004 | Shukh et al. |
| 2005/0011064 A1 | 1/2005 | Lee |
| 2005/0024779 A1 | 2/2005 | Le et al. |
| 2005/0068671 A1 | 3/2005 | Hsu et al. |
| 2006/0044681 A1 | 3/2006 | Le et al. |
| 2006/0139802 A1 | 6/2006 | Sasaki et al. |
| 2006/0168603 A1 | 7/2006 | Goto |
| 2008/0148301 A1 | 6/2008 | Masaoka et al. |
| 2008/0184278 A1 | 7/2008 | Leigh et al. |

* cited by examiner

METHOD FOR MANUFACTURING A PERPENDICULAR MAGNETIC RECORDING TRANSDUCER

FIELD OF THE INVENTION

The present invention relates to magnetic recording technology, and more particularly to a method and system for fabricating a perpendicular recording transducer.

BACKGROUND

Figure 1:
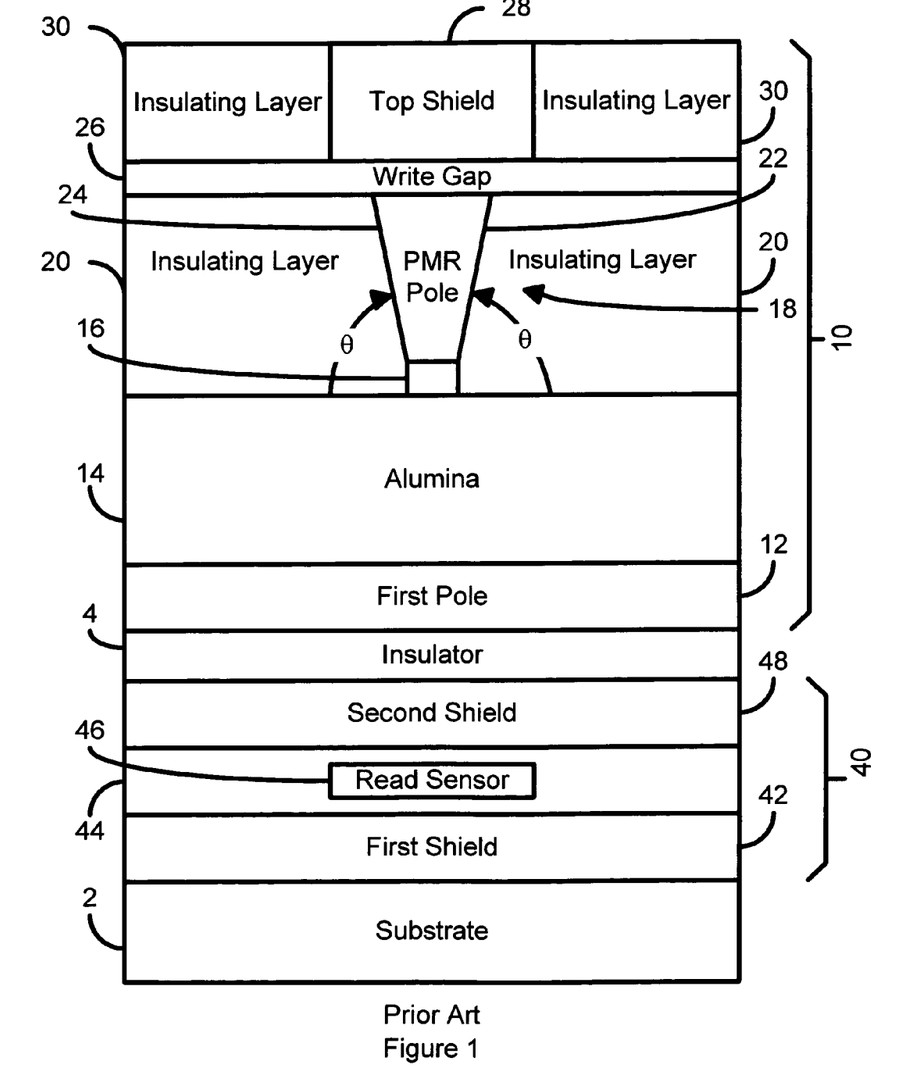
FIG. 1 is diagram depicting a conventional perpendicular magnetic recording head including a conventional perpendicular magnetic recording pole.

FIG. 1 depicts a portion of conventional head 1 including a conventional perpendicular magnetic recording (PMR) transducer 10 and conventional read transducer 40 separated by an insulator 6, as viewed from the air-bearing surface (ABS). Also depicted is the substrate 2, which may be part of a body of a slider (not separately depicted in FIG. 1). The conventional read transducer 40 includes shields 42 and 48, read sensor 46, and insulator 44. The conventional PMR transducer 10 includes a conventional first pole 12, alumina insulating layer 14, seed layer 16, conventional PMR pole 18, insulating layer 20, write gap 26, top shield 28, and insulating layer 30. Note that the top shield 28 may also act as pole during writing using the conventional PMR transducer 10. The conventional PMR pole 18 and the top shield 80 are surrounded by insulating layers 20 and 30, respectively. The conventional PMR pole 18 has sidewalls 22 and 24.

In conventional applications, the height of the conventional PMR pole 18 is typically less than approximately three-tenths micrometer. The conventional PMR pole 18 also has a negative angle such that the top of the conventional PMR pole 18 is wider than the bottom of the conventional PMR pole 18. Stated differently, the angle θ of the sidewalls is less than 90 degrees in the conventional PMR pole 18 of FIG. 1. A pole having this height and shape is desirable for use in PMR applications.

Figure 2:
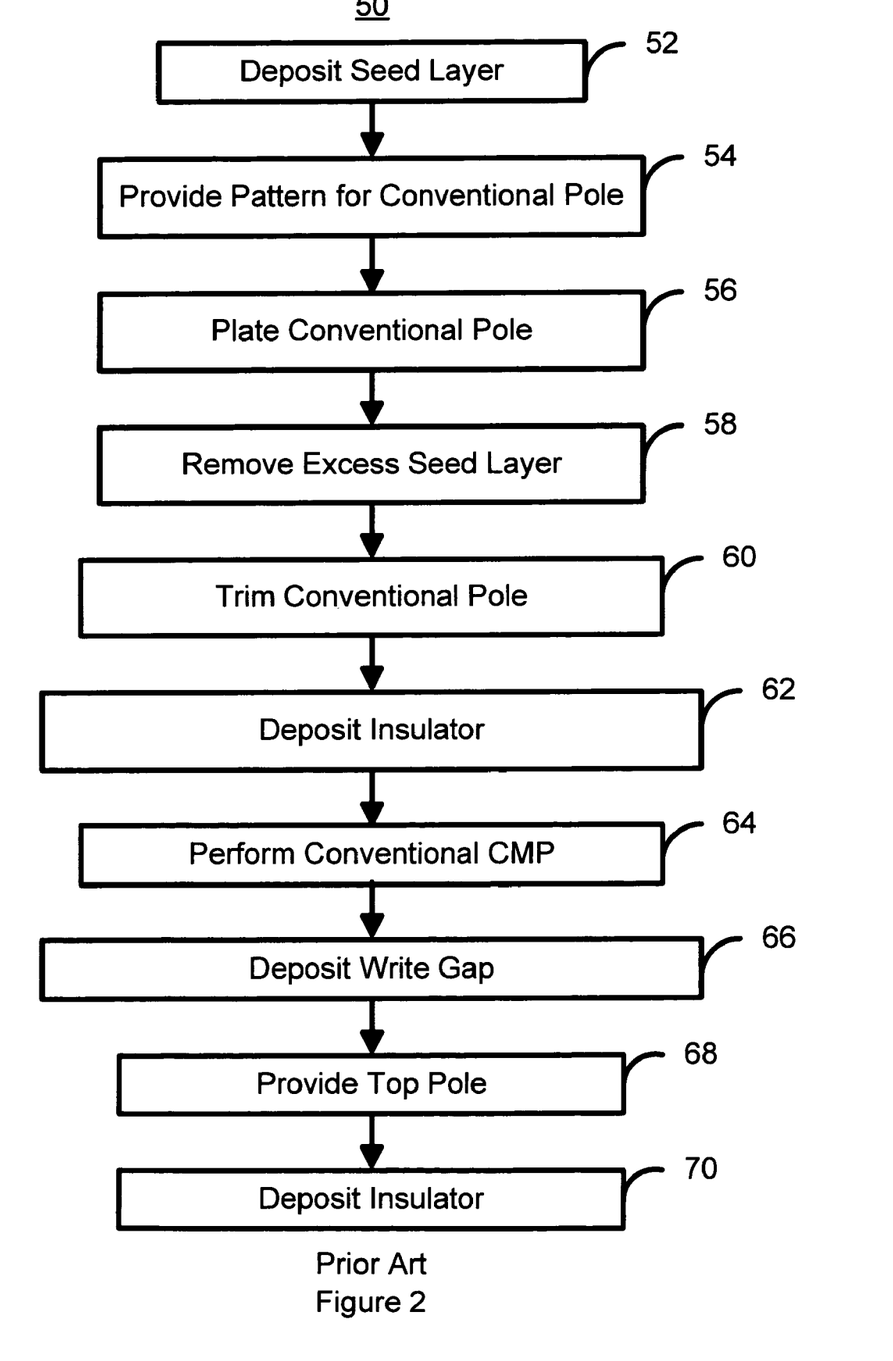
FIG. 2 is a flow chart depicting a conventional method for fabricating a perpendicular magnetic recording pole.

FIG. 2 depicts a conventional method 50 for forming the conventional PMR transducer 10. For simplicity, some steps are omitted. The seed layer 16 for the conventional PMR pole 18 is deposited and the pattern for the conventional PMR pole 18 formed, via steps 52 and 54, respectively. The material for the conventional PMR pole 18 is plated, via step 56. The remaining seed layer around the conventional PMR pole 18 is removed, via step 58. The conventional PMR pole 18 is then trimmed, via step 60. Consequently, the width of the conventional PMR pole 18 and the negative angle are set in step 60. The insulator 20 is deposited around the conventional PMR pole 18, via step 62. A chemical mechanical planarization (CMP) is performed to planarize the surface and expose the conventional PMR pole 18, via step 64. The surface is planarized in order to allow subsequent processing to be performed as desired. The write gap 26 is provided, via step 66. The top shield 28 is deposited and patterned in step 68. Finally, the region around the top shield 28 is insulated, via step 70.

Although the conventional method 50 can be used to form a conventional PMR transducer 10, vertical variations in the CMU process used in exposing the conventional PMR pole 18 in step 64 are relatively large. In particular, the three-sigma variation in the CMP is on the order of three-tenths micrometer. The variation in the CMP process is thus on the order of the height of the conventional PMR pole 18. As a result, the height of the conventional PMR pole 18 may be difficult to control and fabrication of suitable conventional PMR transducers 10 difficult to repeat. Manufacturing of conventional PMR transducers 10 and, therefore, manufacturing of conventional heads 1 may have a low yield.

Accordingly, what is needed is an improved and more repeatable method for fabricating a PMR pole.

SUMMARY

A method and system for manufacturing a perpendicular magnetic recording transducer by a process that includes plating is disclosed. The method and system comprise forming a chemical mechanical planarization (CMP) uniformity structure around a perpendicular magnetic recording pole. The CMP uniformity structure has a height substantially equal to a desired pole height. The method and system also include fabricating an insulator on the CMP uniformity structure and performing a CMP to remove a portion of the insulator. The CMP exposes a portion of the perpendicular magnetic recording pole and planarizes an exposed surface of the perpendicular magnetic recording transducer.

DETAILED DESCRIPTION OF THE PREFERRED EMBODIMENTS

Figure 3A:
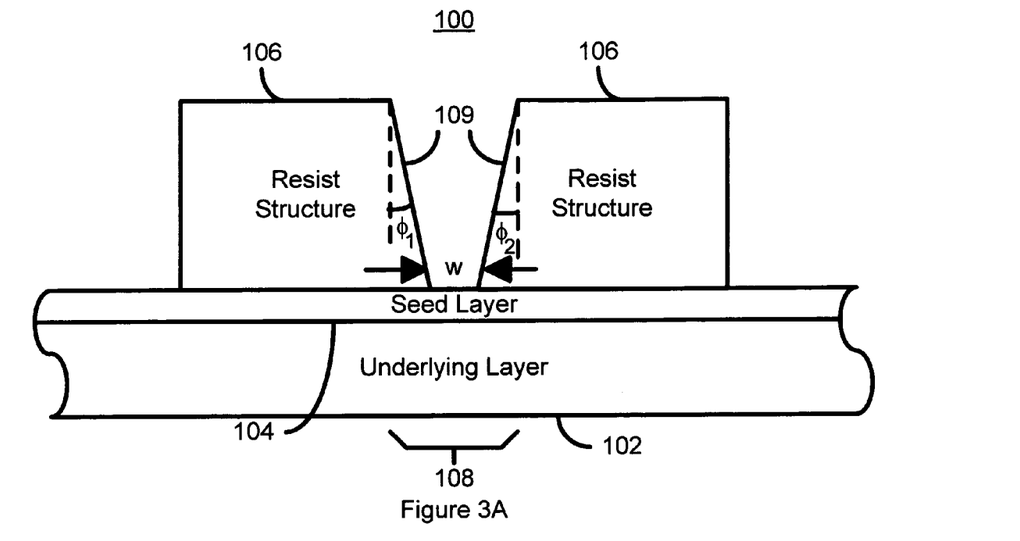
FIGS. 3A-3G depict a portion of a perpendicular magnetic recording transducer formed in accordance with an exemplary embodiment of the present invention.

FIGS. 3A-3G depict one embodiment of a PMR transducer 100 in various stages of fabrication in accordance with an exemplary embodiment of the present invention. The PMR transducer 100 may be incorporated into a head, such as the conventional head 1, in lieu of the conventional PMR transducer 10. To enhance clarity FIGS. 3A-3G are not drawn to scale. FIG. 3A depicts the PMR transducer 100 after formation of the PMR pole commences. A seed layer 104 residing on an underlying layer 102 is depicted. The layer 102 is preferably an insulator, such as $Al_2O_3$, but may also be another material such as NiFe. Also depicted is a photoresist structure 106. The photoresist structure includes an aperture 108 therein. Because there are no structures formed on the insulator 102 in the region of the aperture 108, the topology underlying the photoresist structure 106 is relatively flat. The photoresist structure 106 can thus be formed in the desired manner with the aperture 108 having the desired dimensions and shape. In particular, the angle of the sidewalls 109 and the critical dimensions, such as the width, w, of the bottom of the aperture 108 may be better controlled. Thus, the aperture 108 has sidewalls 109 that are not perpendicular. Instead, the sidewalls 109 make angles, $\phi_1$ and $\phi_2$, with vertical that is between four and ten degrees. In a preferred embodiment, each of the angles $\phi_1$ and $\phi_2$ is between seven and eight degrees. Moreover, the bottom of the aperture 108 preferably has a width, w, of approximately 0.1-0.2 μm.

Figure 3B:
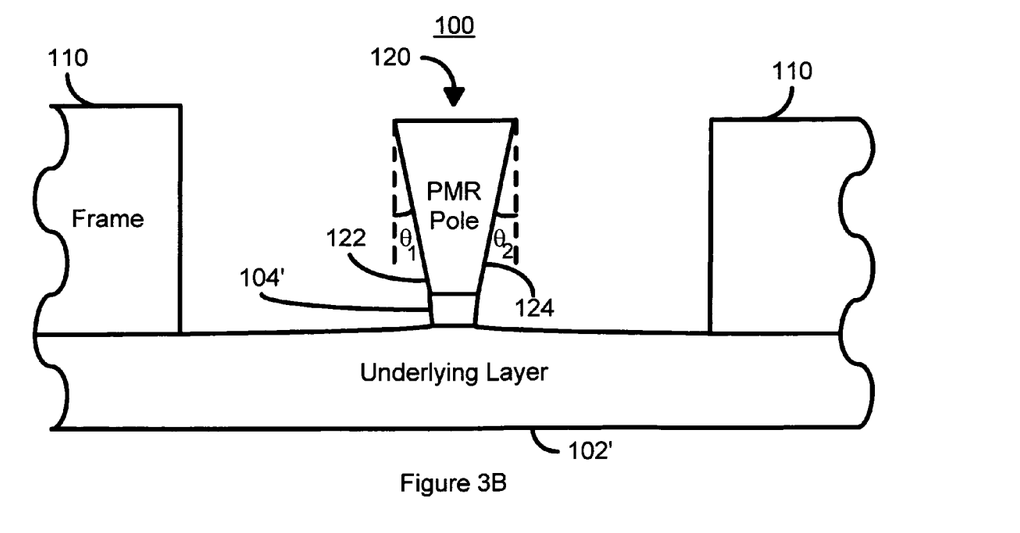

FIG. 3B depicts the PMR transducer 100 after formation of the PMR pole 120. In addition, the resist structure 106 and portion of the seed layer 104 that is not under the PMR pole 120 have been removed. Consequently, only the underlying layer 102' and remaining seed layer 104' are left along with the PMR pole 120 and the frame 110. The frame 110 is preferably formed of the same materials and deposited at the same time as the PMR pole 120. However, in another embodiment, the frame 110 may be formed in another manner. The frame 110 may be approximately at least 0.5 μm, and more preferably at least 1 μm, from the edge of where PMR pole (not shown) is to be formed. However, in a preferred embodiment, the frame 106 is approximately between one microns and ten microns from the edge of where PMR pole (not shown) is to be formed. Thus, the distance between the interior edges of the frame is preferably approximately one to twenty μm.

The PMR pole 120 includes sidewalls 122 and 124. The sidewalls 122 and 124 make angles $\theta$ and $\theta_2$, with vertical such that the top of the PMR pole 120 is wider than the bottom. The angles $\theta_1$ and $\theta_2$ are at least four degrees. In a preferred embodiment, the angles $\theta_1$ and $\theta_2$ are between four and ten degrees, and more preferably between seven and eight degrees. Moreover, the angles $\theta_1$ and $\theta_2$ are substantially the same as the angle $\phi$. The top of the PMR pole 120 is preferably approximately 0.1-0.16 μm wide, while the bottom of the PMR pole 120 is preferably approximately 0.08 μm wide.

In the embodiment shown, the exposed surface of the layer 102' near the PMR pole 120 may not be flat due to processing performed. However, the surface of the layer 102', particularly under the frame 110, is substantially unaffected farther from the PMR pole 120. In addition, in an alternate embodiment, the surface of the layer 102' may be substantially unaffected by processing of the PMR pole 120. Thus, the layer 102' may still provide a relatively flat surface, which is desirable for subsequent processing.

Figure 3C:
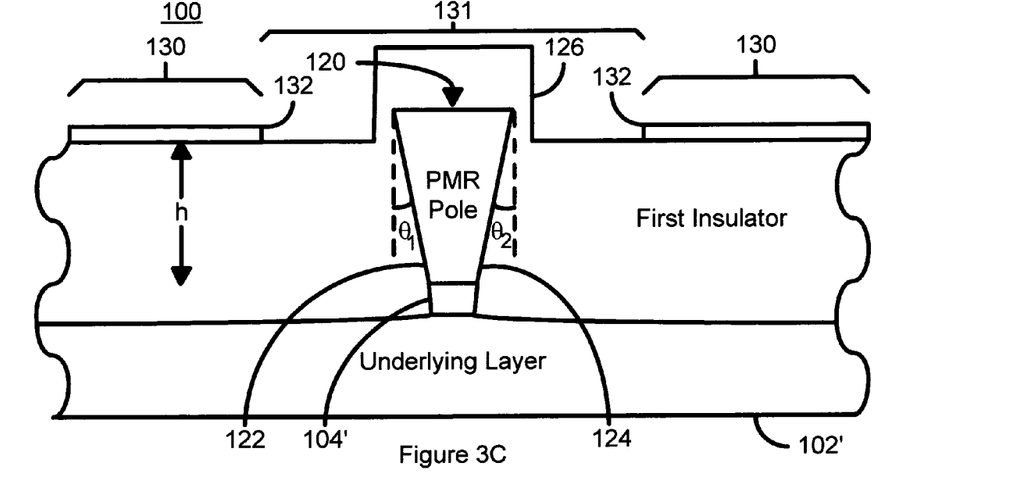

FIG. 3C depicts the PMR transducer 100 after the frame 110 has been removed and the CMP uniformity structure 130 has been formed. The CMP uniformity structure 130 includes CMP marker layer 132 as well as portions of the first insulator 126 under the CMP marker layer 132. The first insulator 126 preferably includes materials such as $Al_2O_3$, $SiO_2$, SiN, and/or diamond-like carbon (DLC). The thickness of the first insulator is such that the desired height, h, of the PMR pole 120 is substantially at the top surface of the first insulator 126 and, therefore, at the bottom surface of the CMP marker layer 132. As a result, the edges of the aperture 131 may be approximately at least 0.5 μm, and more preferably at least 1 μm, from the edges of the PMR pole 120. In a preferred embodiment, the edges of the aperture 131, and thus the interior edges of the CMP marker layer 132, are approximately between one micron and ten microns from the edges of the PMR pole 120. Thus, the distance between the interior edges of the CMP uniformity structure 130 is preferably approximately one to twenty μm. Further, as can be seen from FIGS. 3B and 3C, the interior edges of the frame 110 are preferably aligned with the CMP uniformity structure 130.

The CMP marker layer 132, and thus the CMP uniformity structure 130, includes an aperture 131 therein. The CMP marker layer 132 is preferably composed of a material, such as Ta or DLC, which has a slow etch rate during a CMP. In addition, the CMP marker layer 132 is preferably metallic to reflect light, allowing for optical endpoint detection. The thickness of the CMP marker layer 132 is at least one hundred Angstroms and less than or substantially equal to one thousand Angstroms. In a preferred embodiment, the CMP marker layer 132 is between three hundred and five hundred Angstroms thick. In addition, the interior edges of the CMP marker layer 132 and thus the edges of the aperture 131 are preferably substantially directly above the interior edges of the frame 110.

Figure 3D:
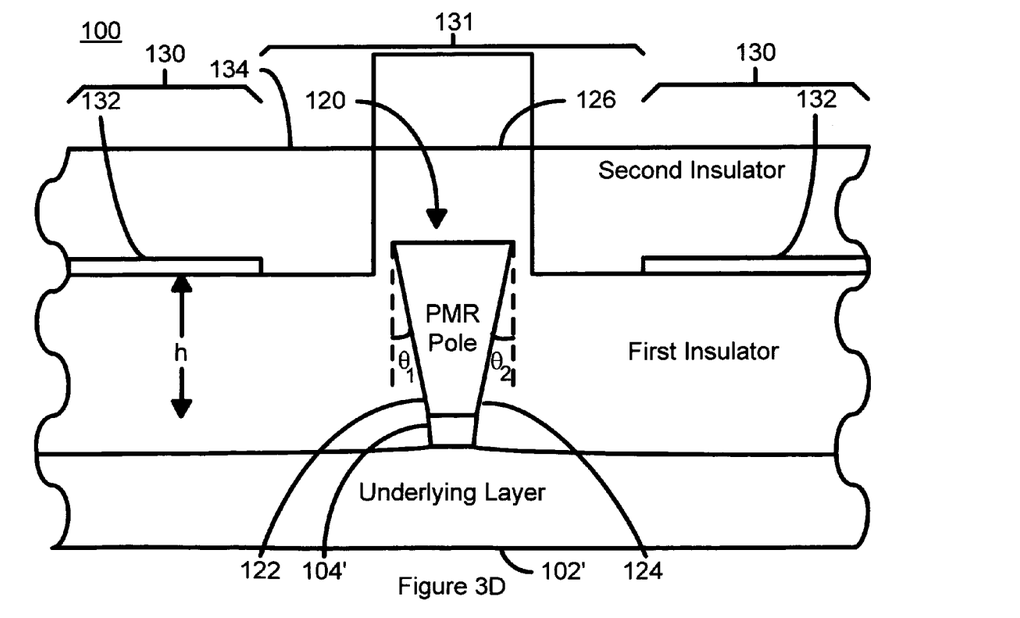
Figure 3E:
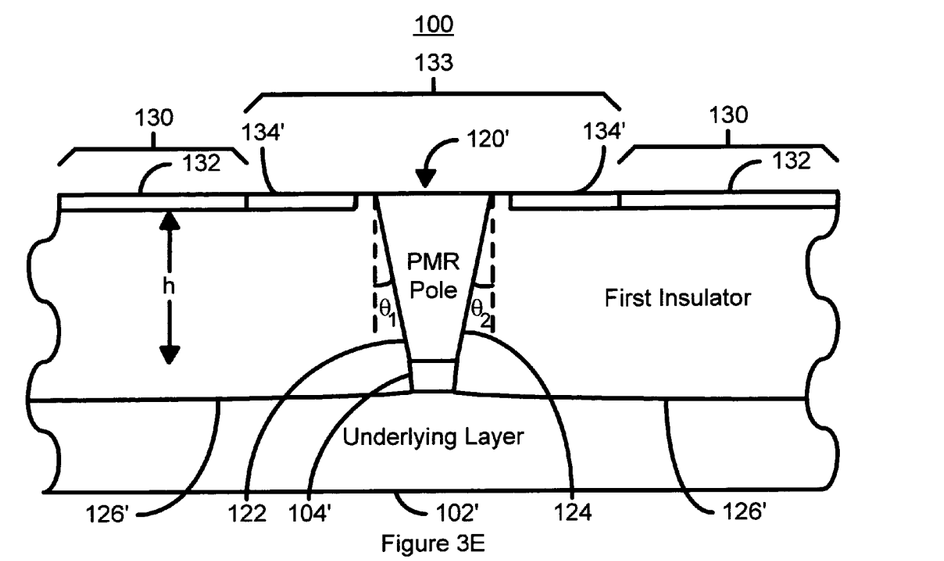

FIG. 3D depicts the PMR transducer 100 after a second insulator 134 is provided. In a preferred embodiment, the second insulator 134 includes materials such as $Al_2O_3$, $SiO_2$, SiN, and/or DLC. FIG. 3E depicts the PMR transducer 100 after a CMP has planarized the surface of the PMR transducer 100. The CMP performed stops at or within the CMP marker layer 132 of the CMP uniformity structure 130. In addition, a portion of the top of the PMR pole 120 is preferably removed, leaving the PMR pole 120'. Because of the CMP uniformity structure 130, the variation in height of the top, exposed surface of the PMR transducer 100 is reduced. This exposed surface includes the CMP marker layer 132 and the remaining portions of the first insulator 126' and the second insulator 134'. Because of the CMP uniformity structure 130, the resulting surface has less variation in height than a conventional structure. The three sigma variation is less than the height of the PMR pole 120'. In one embodiment, the three sigma variation is on the order of 0.1 μm. In addition, an interface between the first insulator 126' and the second insulator 134' can be seen.

Figure 3F:
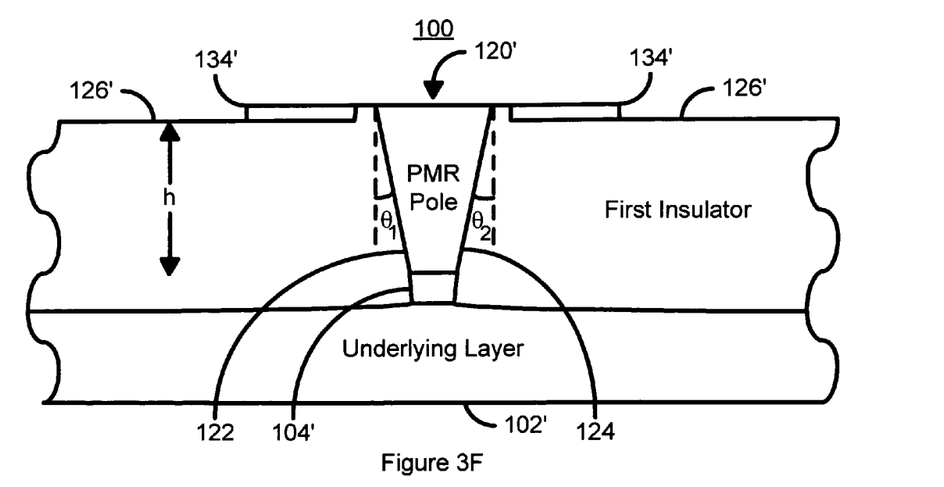
Figure 3G:
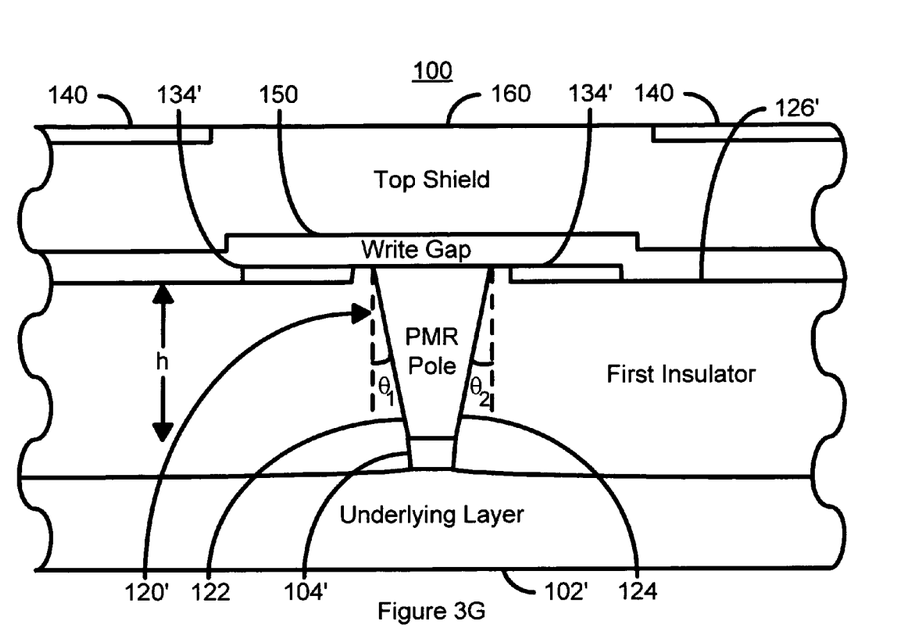

FIG. 3F depicts the PMR transducer 100 after the CMP marker layer 132 has been removed. In another embodiment, the CMP marker layer may not be removed. FIG. 3G depicts one embodiment of the PMR transducer 100 after further processing has been completed. Thus, the insulator 140, the write gap 150, top shield 160, are depicted. Because the CMP marker layer 132 (not shown in FIG. 3G) is removed, a small step 138, 155, and 165 can be seen in each of the first insulator 126', the write gap 150, and the top shield 165, respectively. Note that if the write gap 150 and/or the top shield 160 do not extend beyond step 138 in the first insulator 126, then the step 155 and/or 165 may be missing.

Thus, the PMR pole 120' having the desired shape and dimensions may be more reliably fabricated and a more planar surface provided for subsequent steps in manufacturing the PMR transducer 100. Moreover, the CMP may be more easily and closely controlled using optical endpoint detection on the CMP marker layer 132 of the CMP uniformity structure 130. Consequently, the PMR transducer 100 may be more reliably fabricated at lower dimensions.

Figure 4:
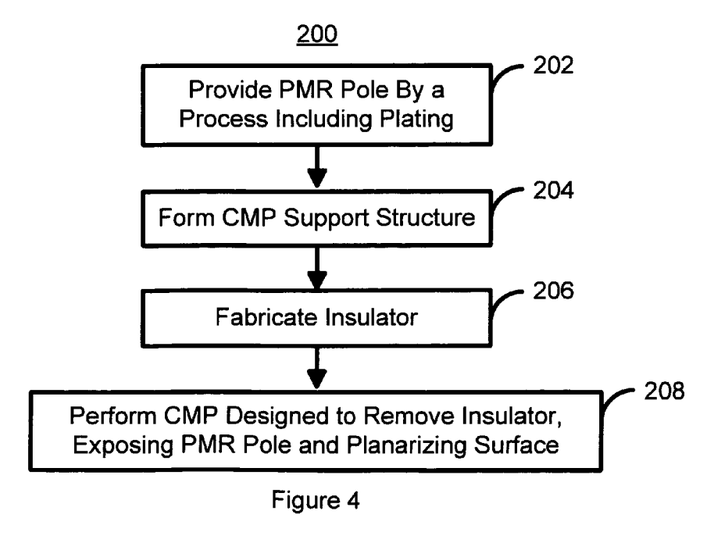
FIG. 4 is a flow chart depicting a method for fabricating a perpendicular magnetic recording pole in accordance with an exemplary embodiment of the present invention.

FIG. 4 is a flow chart depicting a method 200 for fabricating a PMR pole in accordance with an exemplary embodiment of the present invention. The method 200 is described in the context of forming a single PMR transducer 100. However, one of ordinary skill in the art will readily recognize that typically multiple PMR transducers 100 are fabricated simultaneously on a substrate. One of ordinary skill in the art will also readily recognize that other and/or additional steps not inconsistent with the present invention may be included in the method 200. Further, for clarity, the method 200 is described in the context of PMR transducer 100. However, the method 200 may be used to make other PMR transducers (not shown).

The PMR pole 120 is provided using a process that includes plating, via step 202. Step 202 preferably includes preferably includes forming the resist structure 106 as well as electroplating the material(s) for the PMR pole 120 and the frame 110. In addition, step 202 may include trimming the PMR pole 120, removing the excess seed layer 104, and removing the frame 106 using a field etch. The pole trim may be performed before or after the field etch. The CMP uniformity structure 130 is formed around the PMR pole 120, via step 204. The CMP uniformity structure 130 formed in step 204 has a height substantially equal to a desired pole height. Step 204 includes providing the first insulator 126 and providing the CMP marker layer 132. The second insulator 134 is fabricated on the first insulator 126 and the CMP marker layer 134, via step 206. A CMP is then performed, via step 208. The CMP is configured to remove a portion of the second insulator 134, thereby exposing the PMR pole 120' and planarizing the surface. The CMP uniformity structure 130 provided in step 202 is configured to improve the uniformity of the CMP performed in step 208 and provide a more planar surface. Fabrication of the PMR transducer 100 may then be completed.

Using the method 200, the PMR pole 120' may be provided. Because of the use of the CMP uniformity structure 130, the CMP performed in step 208 results in a more planar surface. In particular, a three sigma variation in height of the PMR transducer 100 of below 0.1 µm may be achieved. In addition, because the CMP uniformity structure 130 is formed after the PMR pole 120 is fabricated, the resist structure 106 having the desired shape and critical dimensions of the aperture 108 can be formed. The PMR pole 120' having the desired shape, angle θ, and critical dimensions may be fabricated. Thus, the PMR pole 120' may be more reliably fabricated and a more planar surface provided for subsequent steps in manufacturing the PMR transducer.

Figure 5:
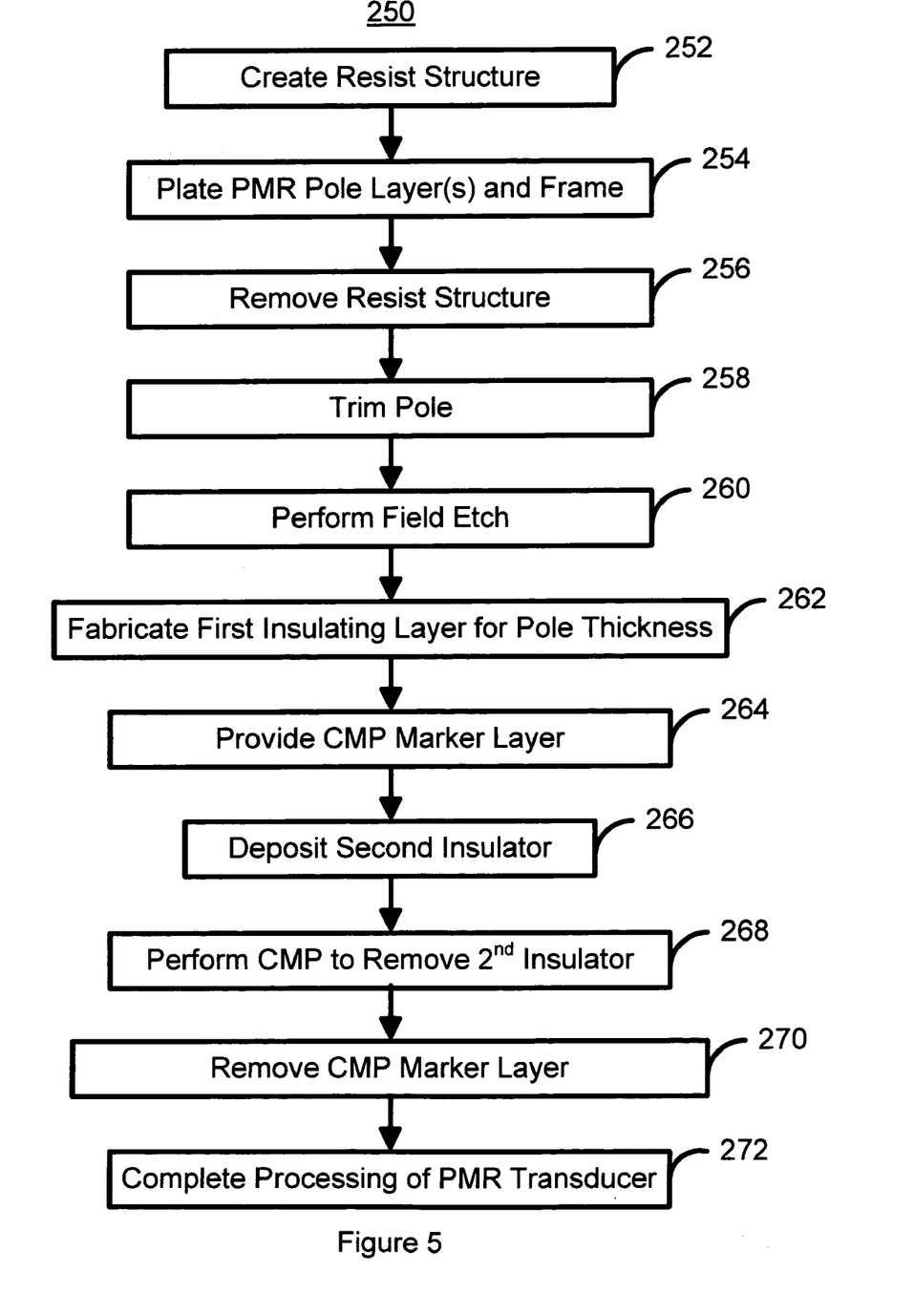
FIG. 5 is a flow chart depicting a method for providing a perpendicular magnetic recording pole in accordance with another exemplary embodiment of the present invention.

FIG. 5 is a flow chart depicting a method 250 for providing a perpendicular magnetic recording pole in accordance with another exemplary embodiment of the present invention. The method 250 is described in the context of forming a single PMR transducer 100. However, one of ordinary skill in the art will readily recognize that typically multiple PMR transducers 100 are fabricated simultaneously on a substrate. One of ordinary skill in the art will also readily recognize that other and/or additional steps not inconsistent with the present invention may be included in the method 250. Further, for clarity, the method 250 is described in the context of PMR transducer 100. However, the method 250 may be used to make other PMR transducers (not shown).

The resist structure 106 formed on the seed layer 104, via step 252. In addition, step 252 includes forming the resist structure such that the aperture 108 has the desired critical dimensions, the desired shape of the sidewalls 109, and the desired angles $\phi_1$ and $\phi_2$. The PMR pole material(s) are electroplated, via step 254. Also in step 254, the frame 110 is plated. In a preferred embodiment, the frame 110 is plated to provide the size of the CMP support structure 130. Stated differently, the frame 110 is preferably fabricated such that the aperture 131 of the CMP support structure 130 resides over the opening in the frame 106. The photoresist structure 106 is removed, via step 256. A pole trim is then performed, via step 258. In a preferred embodiment, the pole trim performed in step 258 is relatively short. Thus, the width of the PMR pole 120 is reduced without substantially changing the shape of the PMR pole 120. Consequently, the PMR pole 120 is provided. A field etch is performed, via step 260. The frame 106 is thus removed. Because part of the underlying layer 102 is covered by the frame 106 during the pole trim, the portion of the underlying layer 102 far from the pole (under the CMP marker layer 132) is substantially unaffected. Consequently, a better measurement of the thickness of the first insulator 126 and thus the PMR pole 120' may be obtained. The first insulator 126 is deposited at a thickness designed to provide the desired height of the PMR pole 120', via step 262. The CMP marker layer 132 is deposited, preferably using a liftoff process, via step 264. The second insulator 134 is deposited, via step 266. The CMP which removes at least most of the second insulator 134, a portion of the first insulator 126 and, in a preferred embodiment, part of the PMR pole 120 is performed, via step 268. Consequently, the PMR pole 120' remains. The CMP marker layer 132 may then be removed, via step 270. Processing of the PMR transducer is completed, via step 272.

Using the method 250, the PMR pole 120' may be provided. Because of the use of the CMP uniformity structure 130, the CMP performed in step 268 results in a more planar surface. In particular, a three sigma variation in height of the PMR transducer of below 0.1 µm may be achieved. In addition, because the CMP uniformity structure 130 is formed after the PMR pole 120 is fabricated, the resist structure 106 having the desired shape and critical dimensions of the aperture 108 can be formed. The PMR pole 120' having the desired shape, angle θ, and critical dimensions may be fabricated. Thus, the PMR pole 120' may be more reliably fabricated and a more planar surface provided for subsequent steps in manufacturing the PMR transducer. Moreover, the CMP performed in the method 250 may be more easily and closely controlled using optical endpoint detection techniques on top of the CMP marker layer 132. Consequently, the method 250 can be used in fabricating a PMR transducer.

Figure 6:
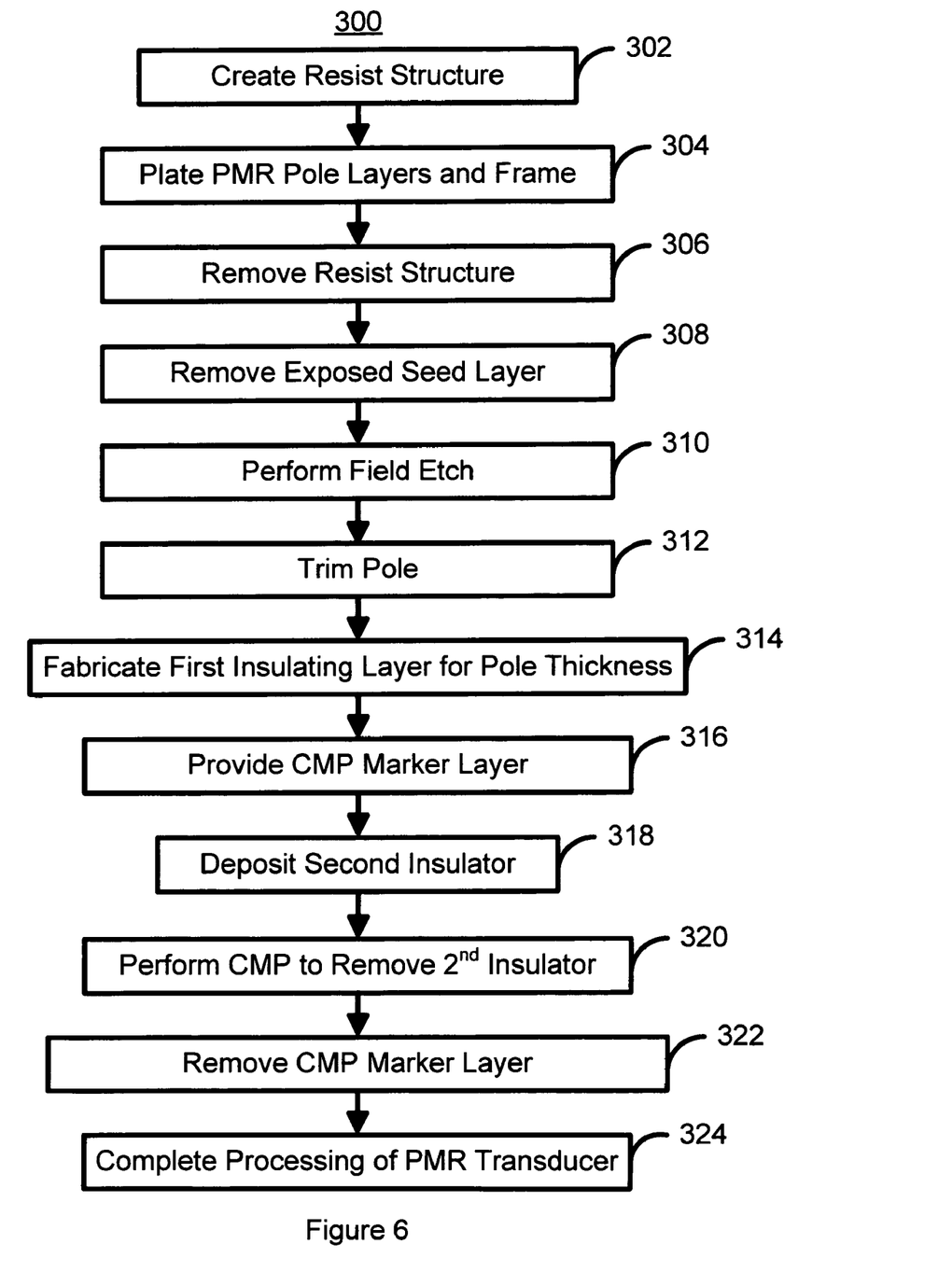
FIG. 6 is a flow chart depicting a method for providing a perpendicular magnetic recording pole in accordance with another exemplary embodiment of the present invention.

FIG. 6 is a flow chart depicting a method 300 for providing a perpendicular magnetic recording pole in accordance with another exemplary embodiment of the present invention. The method 300 is described in the context of forming a single PMR transducer 100. However, one of ordinary skill in the art will readily recognize that typically multiple PMR transducers 100 are fabricated simultaneously on a substrate. One of ordinary skill in the art will also readily recognize that other and/or additional steps not inconsistent with the present invention may be included in the method 300. Further, for clarity, the method 300 is described in the context of PMR transducer 100. However, the method 300 may be used to make other PMR transducers (not shown).

The resist structure 106 formed, via step 302. In addition, step 302 includes forming the resist structure such that the aperture 108 has the desired critical dimensions, the desired shape of the sidewalls 109 and the desired angles $\phi_1$ and $\phi_2$. The PMR pole material(s) and preferably the frame 110 are electroplated, via step 304. In one embodiment, step 304 includes plating the frame 110 to provide the size of the CMP support structure 130. However, in another embodiment, the frame 110 may not provide the size of the CMP support structure 130. The photoresist structure 106 is removed, via step 306. The exposed portions of the seed layer 104, which connect the PMR pole 120 to the frame 110, are removed, via step 308. A field etch is performed, via step 310. The frame 106 is thus removed. A pole trim is then performed, via step 312. In a preferred embodiment, the pole trim performed in step 312 is relatively short. Thus, the width of the PMR pole 120 is reduced without substantially changing the shape of the PMR pole 120. Moreover, any damage to the underlying insulator 102' may be reduced. Thus, the PMR pole 120 is provided.

The first insulator 126 is deposited at a thickness designed to provide the desired height of the PMR pole 120', via step 314. The CMP marker layer 132 is deposited, preferably using a liftoff process, via step 316. The second insulator 134 is deposited, via step 318. The CMP which removes at least most of the second insulator 134, a portion of the first insulator 126 and, in a preferred embodiment, part of the PMR pole 120 is performed, via step 320. Consequently, the PMR pole 120' remains. The CMP marker layer 132 may then be removed, via step 322. Processing of the PMR transducer is completed, via step 324.

Using the method 300, the PMR pole 120' may be provided. Because of the use of the CMP uniformity structure 130, the CMP performed in step 3208 results in a more planar surface. In particular, a three sigma variation in height of the PMR transducer of below 0.1 µm may be achieved. In addition, because the CMP uniformity structure 130 is formed after the PMR pole 120 is fabricated, the resist structure 106 having the desired shape and critical dimensions of the aperture 108 can be formed. The PMR pole 120' having the desired shape, angle θ, and critical dimensions may be fabricated. Thus, the PMR pole 120' may be more reliably fabricated and a more planar surface provided for subsequent steps in manufacturing the PMR transducer. Moreover, the CMP performed in the method 300 may be more easily and closely controlled using optical endpoint detection techniques on top of the CMP marker layer 132. Consequently, the method 300 can be used in fabricating a PMR transducer.

We claim:

1. A method for manufacturing a perpendicular magnetic recording transducer comprising;
    providing a perpendicular magnetic recording pole by a process that includes plating utilizing a frame having an interior frame edge;
    forming a chemical mechanical planarization (CMP) uniformity structure around the perpendicular magnetic recording pole and after the perpendicular magnetic recording pole has been formed, the CMP uniformity structure having a height substantially equal to a desired pole height and an aperture therein, the aperture having an edge substantially aligned with the interior frame edge;
    fabricating an insulator on at least the CMP uniformity structure; and
    performing a CMP to remove a portion of the insulator, exposing a portion of the perpendicular magnetic recording pole and planarizing an exposed surface of the perpendicular magnetic recording transducer.

2. The method of claim 1 wherein providing further includes:
    creating photoresist structure having an aperture therein;
    plating a perpendicular magnetic recording pole layer; and
    stripping the photoresist structure.

3. The method of claim 2 wherein providing further includes:
    trimming the perpendicular magnetic recording pole layer to form the perpendicular magnetic recording pole; and
    performing a field etch after trimming the perpendicular magnetic recording pole layer.

4. The method of claim 2 wherein the photoresist structure further has a frame size corresponding to the interior frame edge.

5. The method of claim 1 wherein providing further includes:
    performing a field etch; and
    trimming the perpendicular magnetic recording pole layer to form the perpendicular magnetic recording pole after the field etch is performed.

6. The method of claim 1 wherein forming further includes:
    fabricating an insulating layer having the height, the insulating layer covering a portion of the perpendicular magnetic recording transducer including the perpendicular magnetic recording pole; and
    providing a CMP marker layer having the aperture therein, the CMP marker layer being on the insulating layer, the aperture residing above the perpendicular magnetic recording pole.

7. The method of claim 6 wherein the CMP marker layer has a CMP removal rate less than an insulator CMP removal rate for the insulator for the CMP used in removing the insulator.

8. The method of claim 7 wherein the CMP marker layer is a metal.

9. The method of claim 6 wherein the aperture has a width of at least 0.5 micron.

10. The method of claim 9 wherein the width is between two microns and ten microns.

11. The method of claim 6 wherein a portion of the insulating layer resides on the perpendicular magnetic recording pole and wherein a portion of the insulator resides on the portion of the insulating layer.

12. The method of claim 1 wherein the perpendicular magnetic recording pole has a top, a bottom, and a side, the side having an angle with respect to a vertical direction that is acute and nonzero such that the top is wider than the bottom.

13. The method of claim 1 further comprising:
    fabricating a write gap on the exposed surface above the perpendicular magnetic recording pole; and
    making a shield on the write gap.

14. A method for manufacturing a perpendicular magnetic recording transducer comprising;
    fabricating a seed layer;
    creating a pattern having a pole aperture therein and using a frame having an interior frame edge;
    plating a perpendicular magnetic recording pole within the pole aperture, the perpendicular magnetic recording pole having a thickness;
    removing the pattern;
    trimming the perpendicular magnetic recording pole;
    forming a chemical mechanical planarization (CMP) uniformity structure around the perpendicular magnetic recording pole and after the perpendicular magnetic recording pole is formed, the CMP uniformity structure having a height substantially equal to a desired pole height, the CMP uniformity structure including a first portion of an insulating layer and a CMP marker layer on the first portion of the insulating layer, the CMP marker layer having an aperture therein, the aperture being above the perpendicular magnetic recording pole, a second portion of the insulating layer residing on the perpendicular magnetic recording pole, a third portion of the insulating layer being distinct from the second portion of the insulating layer and within the aperture, the aperture having an aperture edge corresponding to the interior frame edge;
    fabricating an insulator on at least the CMP uniformity structure; and
    performing a CMP to remove a portion of the insulator and at least the second portion of the insulating layer, exposing a portion of the perpendicular magnetic recording pole and planarizing an exposed surface of the perpendicular magnetic recording transducer.

* * * * *